March 24, 1931.  A. BOULADE  1,797,399
FILTER
Filed Dec. 27, 1926
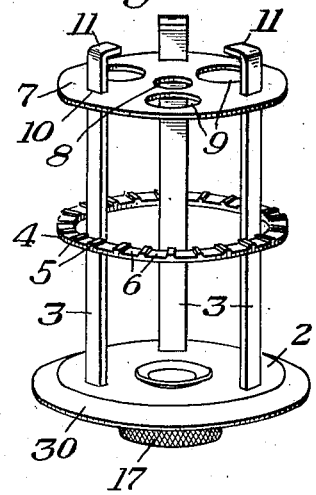
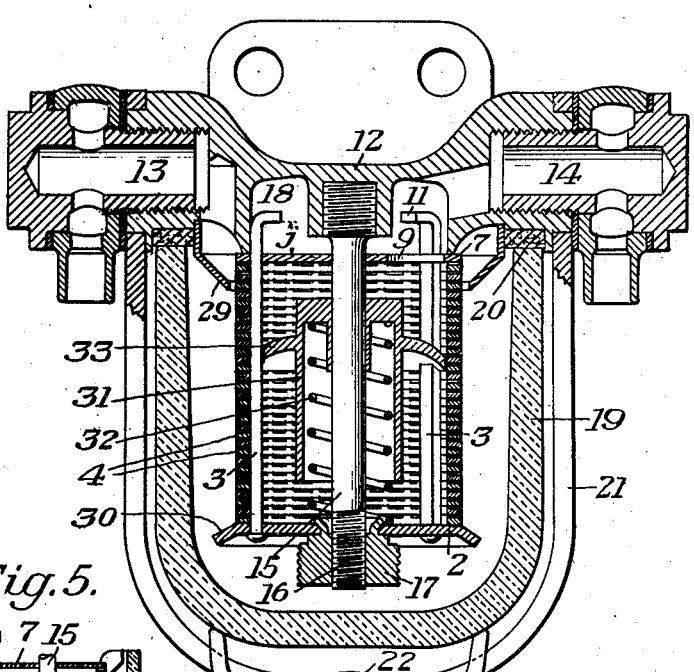
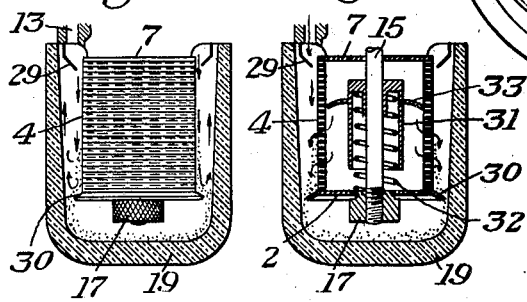
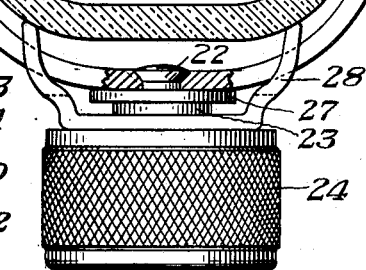
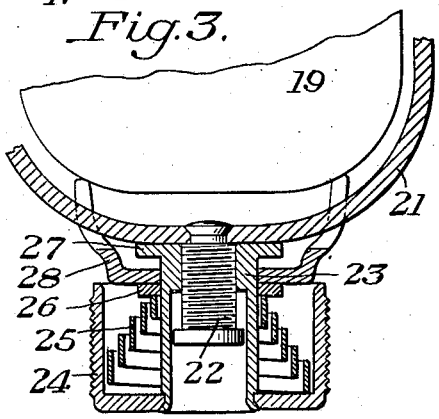
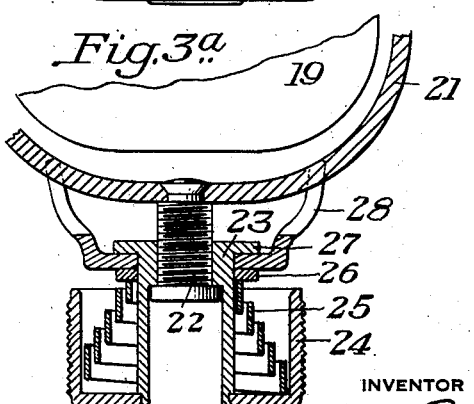
INVENTOR
Antonin Boulade,
by Byrnes, Stebbins & Parmelee,
his attys Patented Mar. 24, 1931

1,797,399

UNITED STATES PATENT OFFICE

ANTONIN BOULADE, OF LYON, FRANCE, ASSIGNOR TO SOCIETE DU CARBURATEUR ZENITH, OF LYON, FRANCE, A CORPORATION OF FRANCE

FILTER

Application filed December 27, 1926. Serial No. 157,121.

The present invention relates broadly to the art of separation, and more particularly to the separation of solid particles from fluid in which they are carried or in which they are in suspension, or solid particles carried by or suspended in air or other gases, and commonly referred to as filtration.

While the present invention provides a filter especially useful for filtering the gasoline supplied to carburetors for automotive vehicles, its utility is not limited with respect to the particular use to which it is placed, certain of the features herein disclosed being equally applicable to other arts for the filtration of other fluids.

The present application constitutes a continuation in part of my copending application Serial No. 56,651, filed September 16, 1925.

It has heretofore been customary in the art to which the present invention relates to construct filters of woven material objectionable in many cases not only by reason of strength but because of conditions imposed by the limitations of weaving. In order to obviate these objections recourse has been had to the use of filters composed of a plurality of similar or dissimilar washers or other bodies suitably assembled and constructed in such manner that when assembled the desired interstitial flow areas or spaces are provided. Usually such bodies have been self supporting and have been so assembled as to permit removal for cleaning or repair.

I have found that even with such filters frequent cleaning is imperative, and as such cleaning necessarily requires complete disassembly, users are prone to put off such a cleaning operation to the detriment of the free flow and filtering action desired. The present invention has for one of its objects the provision of an improved construction such that there is a continuous automatic cleaning action during the use of the filter.

Another object of the present invention is to provide an improved filter assembly of such nature that manual cleaning, should it be necessary, is expedited.

Still another object of the invention is to provide yielding means for clamping the enclosing casing in position, and for insuring a maximum distribution of supplied fluid and a consequent minimum amount of undesirable agitation of previously separated and precipitated solid particles.

In accordance with the present invention there is produced what may be termed a unit filter, composed of a plurality of similar or dissimilar elements adapted to be assembled in desired numbers, preferably more or less permanently, to produce a filter of the required size, and adapted to be easily removed from the filter as a unit and moved relatively to each other to enable the desired manual cleaning thereof.

In the accompanying drawings there is shown for purposes of illustration only, a preferred embodiment of the present invention, it being understood that the drawings do not define the limits of my invention, as changes in the construction and operation disclosed therein may be made without departing either from the spirit of my invention or the scope of my broader claims.

In the drawings:

Figure 1 is a perspective view of the framework of the filtering unit with one of the elements in position thereon;

Figure 2 is a vertical transverse sectional view through a complete filter construction in accordance with the present invention;

Figure 3 is a detail sectional view, on an enlarged scale of the yielding holding means for the enclosing casing;

Figure 3a is a view similar to Figure 3 showing the yielding holding means in releasing position;

Figure 4 is a diagrammatic view illustrating the direction of flow of the entering fluid, and Figure 5 is a diagrammatic view illustrating the action of the automatic cleaning means.

In accordance with the present invention there is provided a filter composed of a plurality of self supporting elements assembled in such manner and number as to give the desired surface and filtering area. As clearly illustrated in Figure 1 of the drawings this may be conveniently accomplished by providing a bottom plate 2 having secured thereto in any desired manner, and projecting upwardly therefrom, a plurality of bars 3, there preferably being three bars equidistantly spaced.

The length of the bars is chosen with respect to the size of filter desired, the bars being adapted to slidably receive and support a plurality of similar or dissimilar elements 4. These elements may conveniently comprise an annular body having suitably formed on one or both sides thereof a series of projections 5 forming intermediate depressions 6. In Figure 1 there is shown only a single element in position, but it will be apparent that the desired number of elements is mounted in superimposed relation on the bars. After all of the elements are in position, a top plate 7 having a central opening 8, fluid openings 9, and bar receiving slots 10 is slipped into position over the upper ends of the bars, and the ends 11 of the bars bent inwardly to prevent accidental removal or displacement of the elements. This forms a filtering unit which may be removed as such when desired.

In Figure 2 there is illustrated a commercial form of filter suitable for the filtration of gasoline as supplied to internal combustion engines for automotive or other purposes. In this embodiment there is provided a filter body 12 having a fuel inlet 13 and an outlet 14. Projecting downwardly from the body is a stem 15 preferably threaded into the body and formed at its lower end with a threaded portion 16 for cooperation with a nut 17 spun into a hole provided in the bottom plate 2 in such manner as to be free to turn relatively thereto.

A completed filtering unit as before described may be slipped upwardly over the stem 15 and the nut 17 threaded onto the stem. This serves to clamp the filtering elements between the top and bottom plates, the upper ends of the bars 3 at this time sliding through the top plate and into the recess 18 provided therefor in the filter body. Due to the fact that the clamping pressure is uniformly distributed with respect to the filtering elements, deformation thereof is avoided. By reason, however, of their inherent elasticity no special means is necessary to prevent unscrewing of the nut 17 under the vibration of the vehicle carrying the filter.

It will be apparent that upon removal of the filtering unit the elements will no longer be pressed against one another, but will be loosely held by the inturned ends 11. This construction permits the elements to move relatively to the bars 3 and to each other a distance $j$ as indicated in Figure 2. It is accordingly easy to clean the unit by scraping it or by immersing it in gasoline or other liquid.

With the unit in position on the stem, the desired closure may be effected by a glass bowl 19 seating against an annular gasket 20. The bowl may be held in position by a yoke or stirrup 21 having its ends pivotally mounted on the body 12 whereby it may be swung laterally into and out of position as required to permit application or removal of the bowl. In order to hold the bowl in position while preventing possibility of breakage thereof by reason of undue pressure, a bolt 22 is preferably riveted in position in the yoke and projects downwardly therefrom as clearly shown in Figures 3 and 3a. Threaded onto the bolt 22 is a nut 23 carrying a knurled finger piece 24 substantially cup shaped and adapted to receive a coil spring 25 bearing at one end against the bottom of the finger piece and at the other end against a washer 26. Mounted on the nut 23 between the upper flange 27 thereon and the washer 26 is a clamping cup 28 slotted to straddle the yoke 21 whereby in upper position it may bear directly against the bottom of the glass bowl 19. By reason of this construction it will be apparent that when the finger piece 24 and nut 23 are threaded upwardly on the bolt 22 into the position shown in Figure 3, the spring will be compressed and will yieldingly urge the clamping cup 28 against the bowl 19. When, however, these parts are threaded downwardly on the bolt into the position of Figure 3a, the spring and clamping cup will both be released, thereby permitting the yoke to be swung laterally to clear the bowl. The pressure on the bowl is at all times limited by the strength of the spring, and it may be so selected as to insure the desired clamping action while preventing any possibility of breakage of the bowl.

In Figures 2, 4, and 5 there is illustrated a deflector 29 preferably carried by the body 12 and so located as to effectively distribute incoming fuel entirely around the filtering unit and thereby avoid any strong current such as might agitate the foregn matter already gathered in the filter and retard free flow therethrough. The bottom plate 2 is also formed with an inclined edge 30 of such dimensions relatively to the internal diameter of the bowl 19 as to leave only a small annular passage between the bowl and itself. This cooperates with the deflector 29 in preventing undue agitation of the foreign matter in the bottom of the bowl. In Figure 4 the paths of flow of the fluid and foreign matter are clearly indicated.

In order to obviate the necessity of frequent manual cleaning of the filter, and in order to maintain a continuing high efficiency in the operation thereof, there is preferably provided means for automatically effecting a cleaning action while the filter is in operation. This automatic cleaning means is clearly shown in Figures 2 and 5 of the drawings, and comprises a relatively heavy body 31 guided by the stem 15 and cooperating with a comparatively light spring 32 permitting the body to easily move upwardly and downwardly in response to the vibrations of the associated vehicle. During such movement it alternately or at different times hits the top and bottom plates, thereby jarring the filter at frequent intervals and preventing the accumulation of foreign material on the unit itself, the loosened particles moving downwardly as indicated in Figure 4.

I have found that in addition to the cleaning effected by the jarring it is also desirable to produce a counter flow effective for actually loosening any particles which may have become lodged in the interstitial spaces. Such an outward flow of the liquid is produced by providing the body 31 with an extension 33 of such diameter that a comparatively small space or clearance is left between its edge and the inner surface of the filtering unit. On the downward stroke of the body this extension is obviously effective for forcing a portion of the liquid therebelow outwardly between the elements with considerable velocity thereby helping materially in the removal of any impurities which might cling to the elements. In Figure 5 the outward flow produced by the extension 33 is clearly indicated.

Certain advantages of the present invention arise from the provision of a filter constructed of a plurality of self supporting elements preferably so assembled as to produce a filtering unit adapted to be bodily removed or replaced at will and such that relative movement between the elements of the unit is possible for cleaning purposes.

Other advantages of the invention arise from a construction such that undue agitation of previously precipitated foreign particles is prevented.

Still other advantages result from the provision of a filter having means for effecting an automatic cleaning action either by jarring or by a counter flow of fluid, and preferably by both.

Further advantages are obtained by reason of the resilient or flexible means for clamping the bowl in position whereby the desired seal is insured without any danger of breakage.

I claim:

1. In a filter, a bottom plate, a plurality of bars projecting therefrom, filtering elements supported by said bars, means preventing removal of said elements while permitting relative movement therebetween, and means for clamping said elements in position.

2. In a filter, a bottom plate, supporting means projecting therefrom, and filtering elements loosely carried by said supporting means, said supporting means being constructed to prevent accidental removal of said elements while permitting relative movement therebetween.

3. In a filter, a body, a stem projecting therefrom, and a filtering unit bodily removable from said stem, said unit comprising a plurality of units relatively movable to each other within a confined area only when and as said unit is removed from said body and stem.

4. In a filter, a body, a stem projecting therefrom, and a filtering unit bodily removable from said stem, said unit comprising a plurality of units relatively movable to each other within a confined area only when and as said unit is removed from said body and stem, there being means on said stem for clamping said unit in position thereon.

5. In a filter, a filtering body, and resiliently mounted means movable relatively to said body for producing a cleaning flow of fluid in a reverse direction through said body upon movement of said means.

6. In a filter, a body, a stem thereon, a filtering means supported by said stem, and means movable along said stem for producing a reverse flow of fluid through said filtering means for cleaning the same.

7. In a filter, a body, a stem thereon, a filtering means supported by said stem, and means movable along said stem for cleaning said filtering means, said movable means being effective for producing a cleaning flow of fluid through the filtering means.

8. In a filter, a body, a stem thereon, a filtering means supported by said stem, and means movable along said stem for cleaning said filtering means, said movable means being effective for producing a cleaning flow of fluid through the filtering means and for jarring the same.

9. In a filter, a removable unit comprising a supporting framework, a plurality of elements relatively movable with respect to each other and said framework when the unit is removed, said framework being constructed to positively limit such relative movement at all times, and means for clamping said framework in position.

10. In a filter, a filter body, a unit removable from said body and comprising supporting means removable with the unit, a plurality of filtering elements loosely carried by said supporting means and adapted for limited relative movement only, supporting means for said entire unit when the unit is cleaned, and a single means adapted to secure the unit and first mentioned supporting means in position in said body on said second mentioned supporting means and clamp the filtering elements on said first mentioned supporting means to hold the same against relative movement when the unit is in position in the body.

11. In a filter, a filter body, a unit removable from said body and comprising a supporting framework, filtering means carried by said framework and movable thereon when the unit is removed, a removable supporting member for securing said framework to said body, and a single means for simultaneously securing said framework on said supporting member and clamping said filtering means on the framework against movement.

12. In a filter, a filter body, a unit removable from said body and comprising supporting means, a plurality of filtering elements loosely mounted on said supporting means and adapted for relative movement when the unit is removed from the body, said suppporting means being constructed to positively limit the relative movement of said elements at all times when the unit is removed from said body, and means other than said supporting means for securing the unit to the body and clamping said elements against relative movement.

13. In a filter, a filter body, a unit removable from said body and comprising a supporting framework, filtering means mounted on said framework for relative movement thereon when the framework is removed from the body, said framework being constructed to positively limit such relative movement of the filtering means, said filtering means comprising a plurality of elements at least some of which have a surface shaped to provide filtering spaces when the elements are in adjacent relationship, and means other than said framework for securing the unit to said body and holding the elements against relative movement on the framework.

14. In a filter, a filter body, a unit removable from said body and comprising supporting and retaining means, a plurality of filtering elements loosely mounted on said supporting means for limited relative movement only when the unit is removed from said body, and a single means other than said supporting means but adapted to extend therethrough for securing the unit including the supporting means to said body and clamping the elements against relative movement.

15. In a filter, a filter body, a unit removable from said body and comprising a supporting framework, filtering means loosely and movably carried by said framework, and common means other than said framework and adapted to extend completely through the framework and filtering means for securing the unit including the framework to said body and holding the filtering means against movement on said framework.

16. In a filter, a removable unit including a bottom plate, supporting frame means projecting therefrom, filtering elements loosely carried by said supporting frame means, said supporting frame means being constructed to prevent accidental removal of said elements while permitting relative movement therebetween, and means carried by said unit and independent of said supporting means for securing the unit including the supporting means in position and clamping elements in adjacent filtering relationship.

17. In a filter, a removable unit comprising a bottom plate, supporting means secured thereto and projecting upwardly therefrom, a filtering body loosely carried by said supporting means, said supporting means being constructed to prevent accidental removal of said body while permitting relative movement between the same and said means, and a single means carried by said unit and out of contact with said supporting means for securing the unit including the supporting means in position and clamping said body in filtering position.

18. In a filter, a filtering unit comprising a plurality of preformed self-sustaining elements, means for holding said elements against movement, and an inertia actuated fluid deflecting plate movably supported within said elements.

19. In a filter, a filtering unit comprising a plurality of self-supporting elements, means holding said elements against movement, and a fluid deflecting plate movably supported within said elements, said plate being constructed to produce a reverse flow of fluid upon movement thereof.

20. In a filter, a body, a bowl supported thereby, filtering means within said bowl, and fluid deflecting means intermediate said bowl and filtering means for directing the entering fluid downward and against the greater part of the surface of the filtering means.

In testimony whereof I have hereunto set my hand.

ANTONIN BOULADE.